United States Patent [19]
Wittren

[11] 3,995,425
[45] Dec. 7, 1976

[54] DEMAND COMPENSATED HYDRAULIC SYSTEM WITH PILOT LINE PRESSURE-MAINTAINING VALVE

[75] Inventor: Richard Arthur Wittren, Cedar Falls, Iowa

[73] Assignee: Deere & Company, Moline, Ill.

[22] Filed: Mar. 8, 1976

[21] Appl. No.: 664,569

[52] U.S. Cl. .................................. 60/445; 60/452; 60/484; 417/212

[51] Int. Cl.² ................... F16H 39/46; F15B 13/06

[58] Field of Search ............ 60/445, 452, 484, 494; 417/212

[56] References Cited

UNITED STATES PATENTS

| | | |
|---|---|---|
| 2,892,312 | 6/1959 | Allen et al. ........................ 60/427 |
| 2,984,985 | 5/1961 | MacMillin ........................ 60/471 X |
| 3,754,400 | 8/1973 | Parquet ................................. 60/445 |
| 3,826,090 | 7/1974 | Bahl ..................................... 60/445 |
| 3,865,514 | 2/1975 | Lonnemo ............................ 60/452 |

*Primary Examiner*—Edgar W. Geoghegan

[57] ABSTRACT

A hydraulic system having pilot line fluid feedback from a fluid motor to valving which operates to change pump output to compensate for motor demand includes a pressure regulator valve for maintaining a predetermined minimum pressure in the pilot line. The pressure regulator valve eliminates the power wasting pressure differential which normally exists between the pump output and the fluid motor demand in demand compensated hydraulic systems.

6 Claims, 1 Drawing Figure

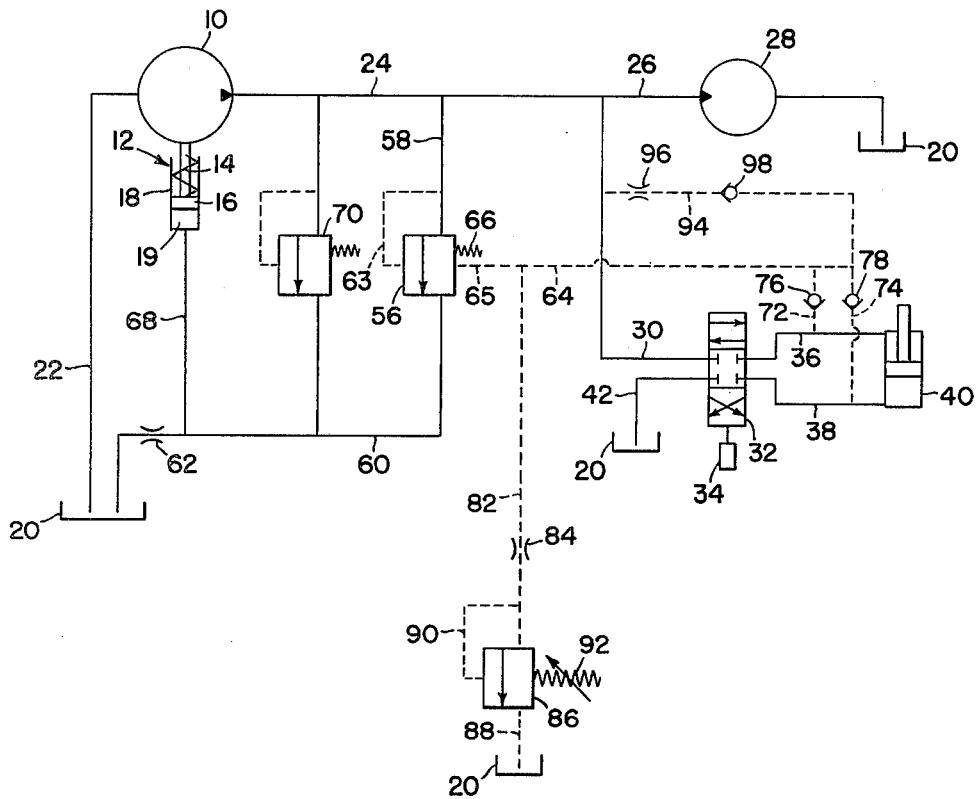

DEMAND COMPENSATED HYDRAULIC SYSTEM WITH PILOT LINE PRESSURE-MAINTAINING VALVE

BACKGROUND OF THE INVENTION

The invention relates generally to hydraulic systems and more particularly to an improved hydraulic system embodying a demand compensated principle in which a minimum feedback fluid pressure is maintained.

In the past, systems such as that shown in the U.S. Pat. No. 2,892,312 granted to J. R. Allen et al. maintained a constant pressure increment or standby pressure between a pump and a motor. This pressure increment was determined by internal biasing in the output control mechanism of the pump which opposed the pilot line fluid feedback. With this arrangement, a first portion of the pressure increment was required to compensate for pressure drops between the pump and the motor at the maximum flow rate and a second portion was required to satisfy any constant pressure requirements in the hydraulic circuit. When high, constant-operating-pressure motors were included in the hydraulic circuit, the second portion became substantial and was always imposed over and above the total pressure required to compensate for pressure drops and to supply the fluid motors. Any pressure increment above the maximum required pressure for the motors becomes a serious power drain and requires that the mechanical components be designed to withstand higher pressures than would be required by all the fluid motors at their maximum pressure demand.

Attempts at solving this problem have included such systems as those disclosed in U.S. Pat. No. 3,754,400 granted to D. J. Parquet and the U.S. Pat. No. 3,826,090 granted to J. M. Bahl. These systems provided pressure boosting means for satisfying the high, constant-operating-pressure equipment and a means for providing a fixed pressure ratio between the pressure required at the pump and at the motor which would compensate for the pressure drop therebetween. However, this fixed pressure ratio while being satisfactory for narrow operating pressure ranges was unsatisfactory for wide operating pressure ranges because a satisfactory compensation for pressure drop at a low pressure was magnified to an excessive compensation at a high pressure.

SUMMARY OF THE INVENTION

The present invention provides an improved demand compensated hydraulic system which includes a pressure regulator valve operatively associated with the pilot line to maintain a minimum fluid feedback pressure and not add any pressure to the feedback at pressures above the minimum. The inclusion of the pressure regulator valve allows the system to have a high standby pressure which does not affect the operating pressures of the system. Further, it provides for the pump output control mechanism of the pump to be set so as to compensate only for the pressure drops in the hydraulic circuit and to maintain only this compensation throughout the operating pressures.

The present invention further provides the advantage of reducing the system response time since a higher standby pressure is possible and thus the pressure increment increase from the standby pressure to the operating pressure will be smaller.

The present invention still further provides increased pump efficiency since all the feedback flow will not have to pass to the reservoir.

The above and additional advantages of the present invention will become apparent to those skilled in the art from a consideration of the following detailed description of the preferred embodiment when taken in conjunction with the accompanying drawing.

BRIEF DESCRIPTION OF THE DRAWING

The drawing shows schematically and partially in section, the demand compensated system employed with a plurality of motors and incorporating the present invention.

DESCRIPTION OF THE PREFERRED EMBODIMENT

Referring now to the drawing, therein is shown a variable displacement pump 10 having an output control mechanism 12 by which the output of the pump 10 may be varied. The specific type of pump is not material, as long as it is any of the well-known variable displacement types in which the output control mechanism 12 is arranged so that its output is increased by a mechanical force, such as a compression spring 14 acting against a piston 16 and the piston 16 is carried in a cylinder 18 so that its face is subjectable to fluid pressure admitted to a fluid receivable chamber 19 opposite the spring 14 to decrease the pump output.

The pump 10 is connected to a reservoir 20 by an intake line 22. The discharge side of the pump 10 is connected via an output line 24 and a supply line 26 to a constant-operating-pressure fluid motor 28. The output line 24 is further connected by a supply line 30 to a motor control valve 32. The control valve 32 may be manually and/or servo operated by any suitable means, represented here schematically at 34. The control valve 32 is illustrated schematically, as are many of the well-known hydraulic components employed in the system, and is of the closed-center type, which permits no flow when in neutral as shown. A pair of motor lines 36 and 38, respectively, connect the control valve 32 to opposite ends of the cylinder of a two-way, fluid pressure motor 40. When the control valve 32 is shifted downwardly from its neutral position, the supply line 30 is connected to the motor line 36 so as to retract the motor 40 and the return of fluid is via the motor line 38 to an exhaust or reservoir line 42. Movement of the control valve 32 to an upward position, opposite the position just described, will interchange the connections so that the motor lines 38 and 36 are connected respectively to the supply and reservoir lines 30 and 42 to extend the motor 40.

To control the output control mechanism 12 there is provided a demand control valve 56. The demand control valve 56 is disclosed in its entirety in the U.S. Pat. No. 2,892,312 granted to J. R. Allen et al. and does not form a part of the present invention, but for purposes of this disclosure it may be described as being a dual-pilot operated, normally-closed valve. The pressure side of the demand control valve 56 is connected to the output line 24 by a line 58 and the non-pressure side is connected to an output control line 60 and through an orifice 62 to the reservoir 20. A first pilot line 63 of the demand control valve 56 is connected to the line 58 and a second pilot line 65 is connected to a main pilot line 64. The demand control valve 56 is biased to its normally-closed position by the action of a spring 66 on the same side as the second pilot line 65. To the extent thus far described, it will be seen the the demand control valve 56 is subjected to at least two forces; namely, pressure via the output line 24 and the spring load via the spring 66. It will be further seen that when the demand control valve 56 is open, pressure from the output line 24 is transmitted via the line 58, the output control line 60, and a control line 68 to the fluid receivable chamber 19 of the output control mechanism 12 so as to oppose the effect of the spring 14 and decrease the pump 10 output. It should be noted that a conventional relief valve 70 is placed in parallel with the demand control valve 56 to limit the maximum pressure output from the pump 10.

In addition to the forces acting on the demand control valve 56 as previously described, the demand control system adds the main pilot line 64 pressure through the second pilot line 65 in conjunction with the force imposed by the spring 66. This main pilot line 64 pressure is obtained through a first and second pilot line branches 72 and 74 which contain check valves 76 and 78, respectively, and which are connected to motor lines 36 and 38, respectively.

The main pilot line 64 is further connected by a reservoir line 82 through a restrictor 84 to the pressure side of a normally-closed, pressure regulator valve 86. The non-pressure side of the pressure regulator valve is connected by a reservoir line 88 to the reservoir 20. The pressure regulator valve 86 is pilot-operated by means of a pilot line 90 connected between the restrictor 84 and the pressure side of the pressure regulator valve 86. The pressure regulator valve 86 is held in its closed position by an adjustable spring 92.

The main pilot line 64 is further connected by a pressurizing line 94 to the output line 24. Disposed in the pressurizing line 94 is an orifice 96 and a check valve 98.

During initial start-up, there will be no pressure in the main pilot line 64 and in the output control line 60, thus the pump 10 will go to maximum stroke to pressurize the output line 24. As the pressure in the output line 24 builds up, the major portion of the fluid will supply the constant pressure fluid motor 28 while a small portion will be diverted through the orifice 96 and check valve 98 to pressurize the main pilot line 64. As the pressure builds up in the main pilot line 64, the demand control valve 56 will remain in its closed position since the pressure in the line 58 initially will not exceed the pressure in the second pilot line 65 plus the force of the spring 66. Thus, the pump 10 will continue to operate at its maximum displacement.

As the pressure in the main pilot line 64 reaches a predetermined stand-by pressure level as determined by the adjustable spring 92, the pressure regulator valve 86 will maintain the pressure by opening to allow fluid flow from the main pilot line 64 through the the reservoir lines 82 and 88 to the reservoir 20. As the pressure in the line 58 exceeds the pressure in the second pilot line 65 plus the force imposed by the spring 66, the demand control valve 56 will open to begin pressurization of the output control line 60. As the fluid receivable chamber 19 pressure increases above the force of the spring 14, the pump 10 displacement will begin to decrease. When the output pressure of the pump 10 substantially balances the pressure in the main pilot line 64 due to the setting of the pressure regulator valve 86 plus the force of the spring 66 and the pressure in the output control mechanism 12 equals the force of the spring 14, the output pressure of the pump 10 will stop changing and a constant standby pressure will be established.

When the control valve 32 is moved from its neutral position so as to cause activation of the fluid motor 40 and increased demand, the pressure in the first or second pilot line branch 72 or 74 will increase causing an increase in the main pilot line 64 pressure.

As the pressure in the main pilot line 64 increases, the pressure regulator valve 86 will be opened and the demand control valve 56 will be closed due to pressure in the second pilot line 65. With the demand control valve 56 closed, the output control line 60 will drain through the orifice 62 causing a decrease of pressure at the output control mechanism 12. As the pressure decreases, the piston 16 will move to increase the displacement of the pump 10 to compensate for the demand. The displacement of the pump 10 will increase until the pressure in the first pilot line 63 opens the demand control valve 56 to supply the pressure required at the output control mechanism 12 to maintain the operating pressure in the output line 24. Thus, the output pressure of the pump 10 will only be greater than that required by the fluid motors 28 and 40 by the pressure required by the output control mechanism 12 and the pressure component due to the setting of the pressure regulator valve 86 is eliminated.

When the control valve 32 is returned to neutral position, the pressure in the main pilot line 64 will be again reduced to the standby pressure as determined by the pressure regulator valve 86 and the output control mechanism 12.

It should be noted that the orifice 96 in the pressurizing line 94 serves a dual function. First, it allows flow from the pump 10 to enter the main pilot line 64 so as to provide predictable pressurization of the main pilot line 64 as compared to a system wherein fluid leakage through the demand control valve 56 is used to pressurize the main pilot line 64. Second, the orifice 96 establishes a controlled flow of warm fluid through the main pilot line 64 to keep it warm so that increases in fluid viscosity in cold environments will not adversely affect the response time of the demand compensated system.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. An improved hydraulic system of the type having a variable displacement pump with an output control means biased to increase pump output and responsive to an input of pressurized fluid to decrease pump output, a fluid motor, a pressurized output line connected between the pump and the motor, a motor control valve interposed in the output line for selectively opening and closing the output line, a control line connected between the pump and output control means, demand valve means interposed in the control line for selectively opening and closing the control line to allow and block the input of pressurized fluid to the output control means in response to differences in the pressure of pressurized fluid between the control line and a pilot line connected to the demand valve means, said pilot line further connected to the output line between the motor control valve and the motor, and a restricted reservoir line leading from said pilot line to a fluid reservoir, wherein the improvement comprises: pressure control means connected to said pilot line for maintaining a predetermined fluid pressure therein.

2. The improvement as claimed in claim 1 including pressurizing means for continuously supplying a flow of fluid from the pump to the pilot line.

3. An improved hydraulic system of the type having a variable displacement pump with an output control means biased to increase pump output and responsive to an input of pressurized fluid to decrease pump output, a fluid motor, a pressurized output line connected between the pump and the motor, a motor control valve interposed in the output line for selectively opening and closing the output line, a control line connected between the pump and the output control means, demand valve means interposed in the control line for selectively opening and closing the control line to allow and block the input of pressurized fluid to the output control means in response respectively to a pressure of pressurized fluid in the control line greater and less than in a pilot line connected to the demand valve means, said pilot line further connected to the output line between the motor control valve and the motor, wherein the improvement comprises: pressure control means connected to said pilot line and operatively associated with the demand valve means for maintaining a predetermined minimum fluid pressure in said pilot line so that a predetermined standby pressure is maintained in the output line.

4. The improvement as claimed in claim 3 including a pressurizing line having an orifice provided therein connecting the pump to the pilot line.

5. An improved hydraulic system of the type having a variable displacement pump with an output control mechanism biased to increase output and responsive to an input of pressurized fluid to decrease pump output, a constant pressure fluid motor, a variable pressure fluid motor, a pressurized output line interconnecting the pump and the motors, a motor control valve interposed in the output line for selectively opening and closing the output line to the variable pressure fluid motor, a control line connected between the pump and the output control mechanism, demand valve means interposed in the control line for selectively opening and closing the control line to allow and block the input of pressurized fluid to the output control mechanism in response respectively to pressurized fluid in the control line greater and less than in a pilot line connected to the demand valve means, said pilot line further connected to the output line between the pump and the constant pressure fluid motor and between the motor control valve and the variable pressure fluid motor, and a restricted reservoir line leading from said pilot line to a fluid reservoir, wherein the improvement comprises: a pressure regulating valve interposed between the restricted reservoir line and the reservoir for maintaining a predetermined minimum pressure in the restricted reservoir line to supply the constant pressure fluid motor when the motor control valve closes the output line to the variable pressure fluid motor.

6. The improvement as claimed in claim 5 including a pressurizing line connecting the output line between the pump and the constant pressure fluid motor to the pilot line, said pressurizing line having an orifice provided therein, and a check valve disposed in the pressurizing line blocking the flow of fluid from the pilot line to the output line.

* * * * *